Patented June 9, 1925.

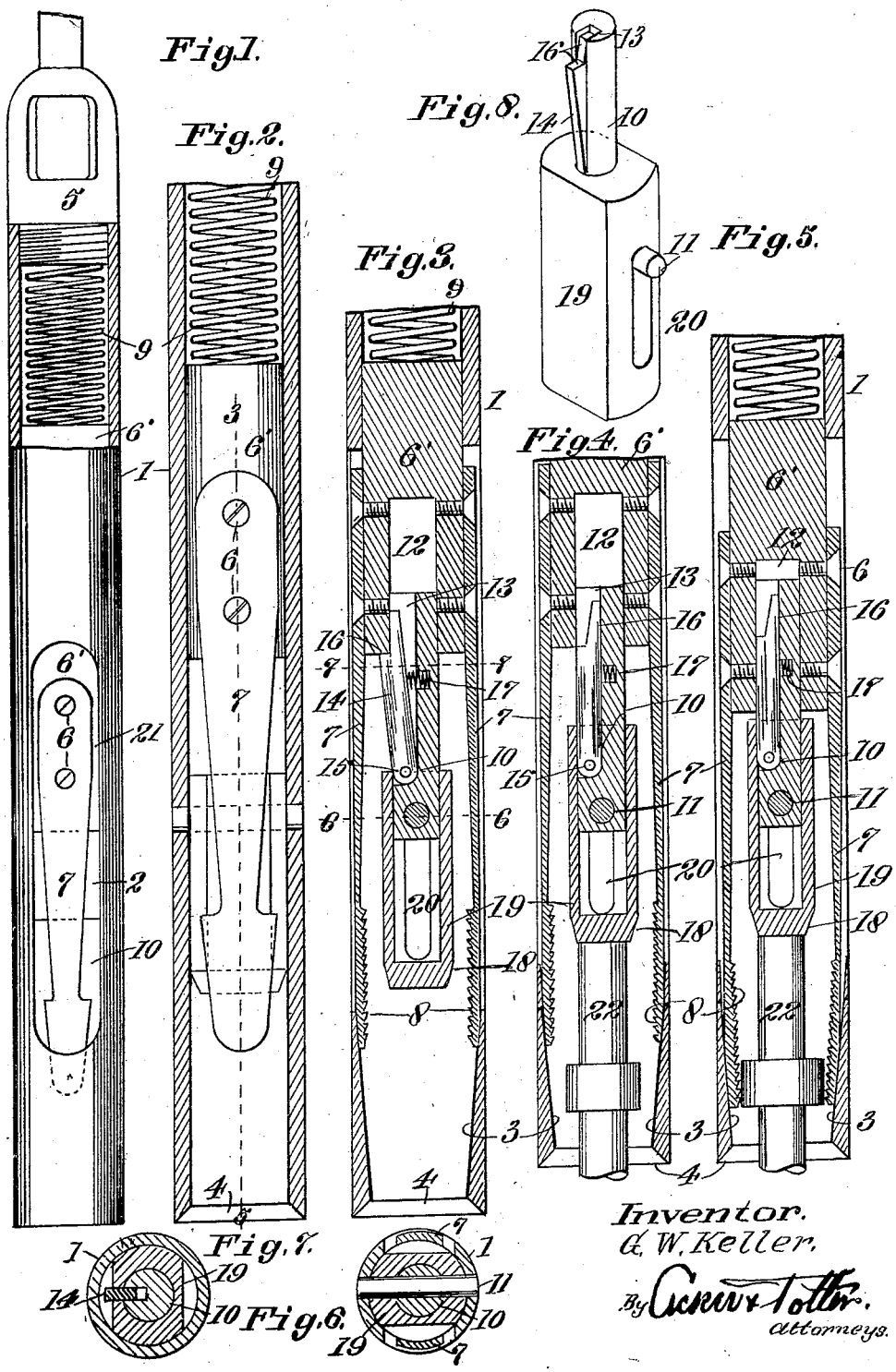

1,541,417

UNITED STATES PATENT OFFICE.

GEORGE WILLIAM KELLER, OF COALINGA, CALIFORNIA.

FISHING TOOL.

Application filed October 8, 1923. Serial No. 667,126.

*To all whom it may concern:*

Be it known that I, GEORGE WILLIAM KELLER, a citizen of the United States, residing at Coalinga, in the county of Fresno and State of California, have invented certain new and useful Improvements in Fishing Tools, of which the following is a specification.

Many types of fishing tools have been devised for use in connection with drilling operations, among some of the well known being the rat-trap and others, but these fishing tools have been extremely limited in their use, and in some cases, due to their nonpositive locking operation, have caused serious damage in the holes by releasing the recovered material before the same has been withdrawn from the hole.

My present invention relates to an improved type of fishing tool which is manually set prior to lowering in the hole. On encountering the object sought for, the mechanism of the tool is tripped causing the slips or jaws to be forcibly moved into engagement with the article and securely embrace the same. By my present invention, I am able, by the interchange of slips, to employ one type of tool in the recovery of pump rods no matter whether the same break above, at, or below their joint union, and by making devices of various diameters am enabled to provide a fishing tool which when sprung by contact with the object in the hole, will tightly grip the object, and the weight of the object will cause a firmer grip to be obtained thereon during its removal from the hole.

The invention consists primarily in a mechanically actuated trigger held plunger mounting engaging devices guided by converging walls, and between which the article to be recovered is received as the device is lowered thereover, there being provided a trigger for releasing by the action of the article to be recovered so that the mechanical plunger can be actuated by the spring to engage the walls of the article.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Fig. 1 is a view in side elevation partly in section of one embodiment of my invention, this embodiment being designed particularly for the recovery of pump or sucker rods.

Fig. 2 is a vertical sectional view illustrating the parts in their set position.

Fig. 3 is a sectional view on line 3—3 of Fig. 2 illustrating the parts in their set position.

Fig. 4 is a view in detail of the trigger support, and the trigger and the trigger release collar with the parts in their set position.

Fig. 5 is a view similar to Fig. 3 with the parts in their released or sprung position.

Fig. 6 is a sectional view on line 6—6 of Fig. 4.

Fig. 7 is a sectional view on line 7—7 of Fig. 5.

Fig. 8 is a view in detail elevation of the trigger, trigger support and trigger release collar.

In the drawings, wherein like characters of reference designate corresponding parts 1 indicates a tubular body provided in its side wall near its lower end with longitudinally disposed opposing oval apertures 2, the inner wall of the body at a point below said apertures being tapered inwardly as at 3 toward its lower end, and the extreme bottom wall of the lower end of the body is inwardly beveled as at 4. The upper end of the tubular body 1 carries a cage type coupling or attaching member 5 of any desired construction enabling the upper end of the body to be secured to a device for lowering the body into and removing the same from the hole. Detachably secured at their upper ends, as at 6, to the lower end of a plunger 6', and one guided in each oval aperture 2, are the slips 7 of spring material. The outer surfaces of the lower ends of the slips are disposed on the inner side of the wall of the tubular body and operate on the tapered wall surfaces 3 at the lower end thereof. The inner faces of the lower ends of the slips are corrugated or toothed as at 8 to provide engaging surfaces. Within the tubular body 1 between the coupling 5 and the upper end of the plunger 6' is a coiled spring 9, the tendency of which is at all times to force the plunger 6' downwardly in the tubular body.

Disposed concentrically within the tubular body 1 at a point near the lower ends of the apertures 2, is a cylindrical trigger support 10, the lower end of which is held in position within the body by a pin 11 extending transversely through said body as in the drawings, and the upper end of said support is received within a cylindrical guide opening 12 formed centrally of the lower end of the plunger 6'. The trigger support 10 is provided with a longitudinally disposed trigger receiving slot 13 opening at the upper end of the support. A trigger 14 is mounted to be received within said slot 13, and is fulcrumed to the support as at 15. The free end of the trigger is notched as at 16 to engage the lower end of the plunger 6', and the coiled spring 17 positioned between the inner face of the trigger and the base of the slot 13 tends to force said trigger outwardly at all times. Mounted for free reciprocation within the tubular body at a point below the trigger support is a trigger release collar 18 provided with a central bore 19 for receiving the lower end of the support 10. The collar is longitudinally slotted as at 20 to permit its movement relative to the pin 11, as hereinafter described.

The device being assembled as in the drawings, the same operates in the following manner:—When it is desired to employ this tool on a fishing job, the operator sets the tool by forcing the plunger 6' upwardly against the tension of the spring 9 until such time as the trigger 16 engages beneath the lower end of the plunger 6', as in Fig. 3 of the drawings. This setting may be accomplished by the operator holding the tubular body 1, and with the end of a suitable implement received in the depression 21 exerting pressure on the plunger to force the same upwardly in the body 1. With the suitable lowering device attached to the coupling 5 the tool is lowered into the hole the desired distance, and as the lower end of the body encounters the part 22 to be recovered, the lower beveled end wall 4 of the body will guide the part into the lower end of said body, at which time the lowering of the body may continue. As the body continues to lower, the upper end of the part 22 to be recovered contacts with the lower end of the trigger release collar 18 and causes the same to ride upwardly on the trigger support 10, bearing against the outer face of the plunger retaining trigger 14. The continued upward movement of the collar 18 forces the free end of the trigger into its slot 13 and ultimately releases the same from engagement with the lower end of the plunger 6'. When this action takes place, the spring 9 actuates the plunger 6' in a downward direction, and causes the lower ends of the slips 7 in their movement over the tapering walls 3 to converge and tightly engage the opposite faces of the article 22 received within the lower end of the body 1. This operation causes a positive engaging of the slips with the body to be recovered, and when it is desired to withdraw the body from the hole the tapering of the wall 3 causes a firmer engagement of the faces 8 of the slips with the slot of the body 22, thus locking the body within the lower end of the fishing tool.

It has been discovered that with the present tool, broken pump or sucker rods may be readily recovered, and if the opportunity is not present for withdrawing the broken part the pumping action may be continued by using the fishing tool as a coupling between the section within the hole and the tubing connected with the fishing tool through the coupling 5.

I claim:

1. A fishing tool comprising a tubular body open at one end and provided adjacent said end with downwardly converging slip guiding surfaces, a plunger reciprocably mounted within said body, a pair of slips carried by said plunger with their free ends engaging said guiding surfaces, a spring within said tubular body engaging said plunger for forcing the slips carried thereby over said surfaces toward each other into part engaging position, a trigger mounting member within said body, a plunger engaging trigger pivotally carried by said mounting member, a trigger releasing member movable into engagement with the trigger to withdraw the same from engagement with the plunger to permit said spring to force said blocks into article engaging position, and a trigger releasing member reciprocably mounted on said trigger mounting member and adapted for engaging the trigger to withdraw the same from engagement with said plunger to permit said spring to force said slips into article engaging position.

2. A fishing tool comprising a tubular body open at one end and provided within its length with opposing longitudinally disposed slots, said body on its inner surface at its lower end provided with downwardly converging slip guiding surfaces, a plunger reciprocably mounted within the upper end of said body, a pair of slips detachably carried at one end by said plunger with their free ends engaging said guiding surfaces, a spring within the upper end of said body and bearing on said plunger, a trigger mounting member held centrally within said body, a trigger pivotally carried thereby for engaging said plunger, and trigger releasing means disposed within said body above its open end movable longitudinally within said body to release said trigger from engagement with the plunger.

3. A fishing tool comprising a tubular body open at one end and provided with downwardly converging slip guiding surfaces, a plunger reciprocably mounted within said body, slips carried by the plunger and engaging said guiding surfaces, a spring engaging the plunger for forcing the slips carried thereby over said surfaces toward each other into part engaging position, a trigger mounting member, a plunger engaging trigger, and a reciprocably mounted trigger releasing member for engaging the trigger to withdraw the same from engagement with said plunger to permit said spring to force said slip into article engaging position, said structure being mounted within said tubular body.

4. A fishing tool comprising a tubular body open at one end and provided with downwardly converging slip guiding surfaces formed on its inner periphery, said body being provided with opposing cut-out portions in its wall, a plunger reciprocably mounted within the body, slips carried by the plunger and disposed with their upper ends guided in said cut-out portions, and with their lower ends bearing on said converging guiding surfaces, means accessible through the upper ends of said cut-out portions for detachably securing the slips to the plunger, a spring coiled in the upper portion of the tubular body and bearing on the plunger, and a releasable trigger below the plunger for releasably holding the plunger in said position.

5. A fishing tool comprising a tubular body open at one end and provided interiorly at its other end with downwardly converging slip guiding surfaces, a plunger reciprocably mounted within the upper portion of the body, a spring within the upper portion of the body bearing on the plunger to force the same downwardly within the body toward its open end, slips detachably secured at their upper ends to the body, a trigger mounting member carried by the body below the plunger, a trigger carried by the mounting member for normally engaging beneath the plunger to hold the same upwardly, and a tubular member disposed axially within the lower end of the body for reciprocative movement on the trigger mounting member to withdraw the trigger from engagement with the plunger.

6. A fishing tool comprising a tubular body open at one end, a plunger reciprocably mounted within said body, slips within said body and operated by the plunger, a spring for operating the plunger, a trigger, a trigger mounting member, a plunger engaging the trigger, and an article actuated trigger releasing member, said structure being mounted within said tubular body.

In testimony whereof I have signed my name to this specification.

GEORGE WILLIAM KELLER.